Figure 1:
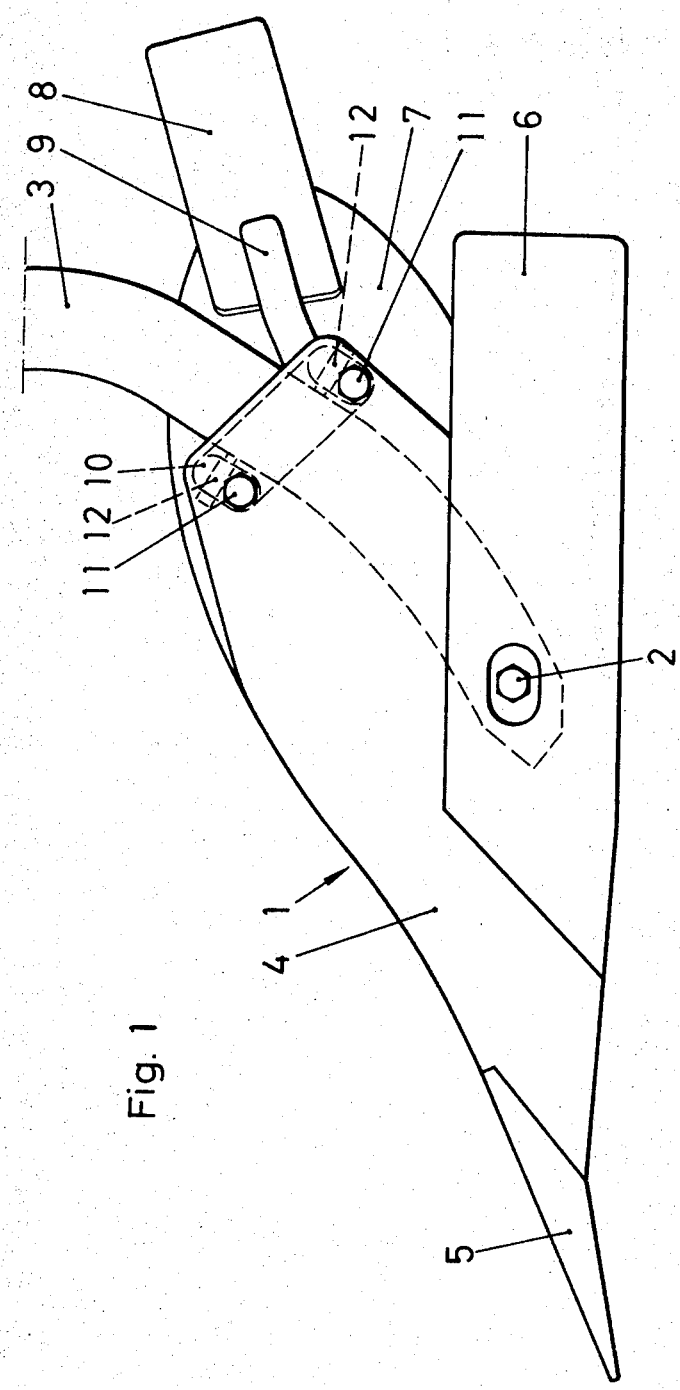

United States Patent

[11] 3,539,020

[72] Inventors Torsten Andersson and
Herbert Carlsson, Overum, Sweden
[21] Appl. No. 710,917
[22] Filed March 6, 1968
[45] Patented Nov. 10, 1970
[73] Assignee Aktiebolaget Overums Bruk
Overum, Sweden
a Swedish joint Stock Company
[32] Priority March 15, 1967
[33] Sweden
[31] 3,579/67

[54] PLOUGH ARRANGEMENT
3 Claims, 2 Drawing Figs.
[52] U.S. Cl. .................................................... 172/740,
172/762
[51] Int. Cl. ...................................................... A01b 15/00
[50] Field of Search ........................................... 172/739,
740, 754, 762

[56] References Cited
UNITED STATES PATENTS
| | | | |
|---|---|---|---|
| 663,977 | 12/1900 | McNaughton ................ | 172/739 |
| 1,010,276 | 11/1911 | Letherman ................... | 172/762X |
| 1,022,256 | 4/1912 | Paul ............................. | 172/739X |
| 2,777,373 | 1/1957 | Pursche ........................ | 172/740X |

Primary Examiner—Robert E. Pulfrey
Assistant Examiner—James W. Peterson
Attorney—Darby and Darby ABSTRACT: This invention relates to a plough arrangement in which a plough body may be adjusted in a longitudinal vertical plane relative to its supporting plough beam by being swung on a pivot connecting the said elements, adjustment and clamping means being provided for effecting such adjustment and for firmly securing the said elements in the set position.

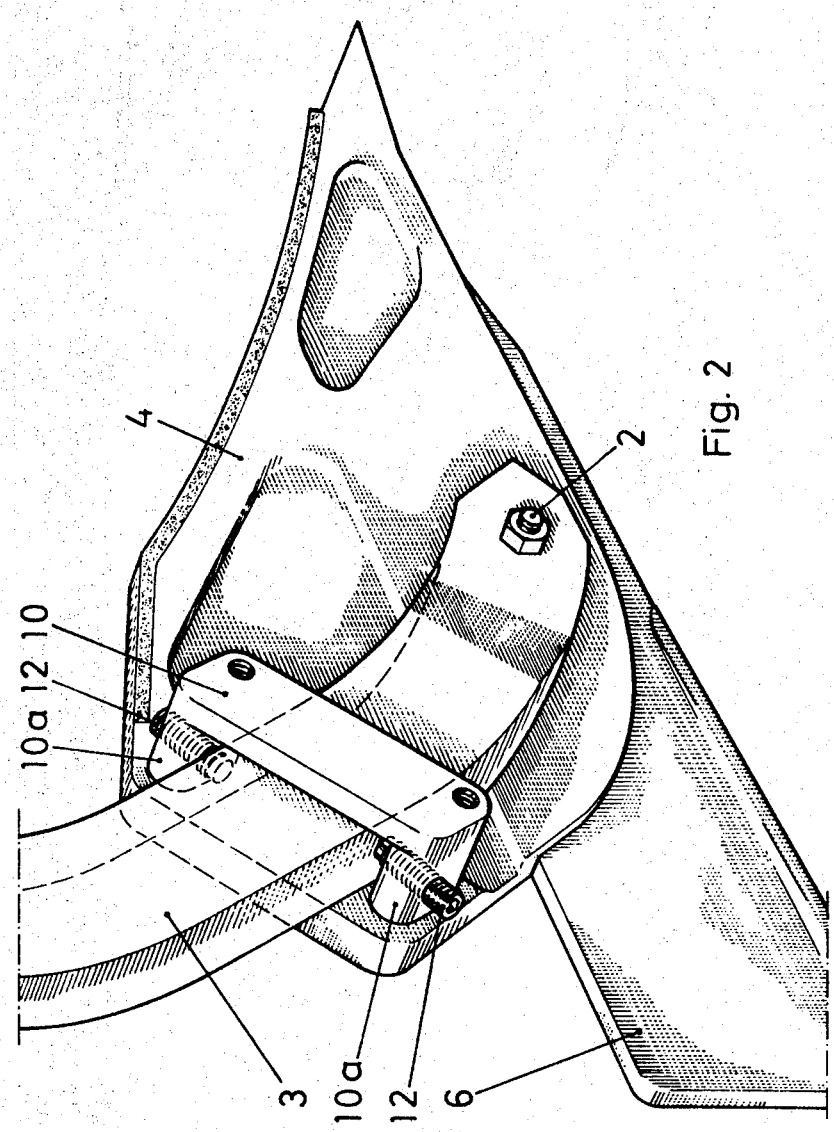

PLOUGH ARRANGEMENT

This invention relates to an arrangement for adjustable connection of a plow body with a plow beam, the plow body preferably being of the kind in which the plow share, the mould board and the landside are supported by a body member.

It is an object of the invention to provide an arrangement of the kind referred to by means of which the longitudinal inclination angle of the plow body may be adjusted smoothly (continuously) and by means of which the plow body is retained in the set position without any play, such having caused in priorly known structures the untightening of bolts belonging to the structure which necessitated frequent inspection and readjustment measures.

The invention is mainly characterized by the fact that the body member is provided at its upper rear portion with a U-shaped bail adapted to be clamped against a vertical surface disposed longitudinally of the plow, said bail being adapted on clamping to firmly engage between itself and the said surface the corresponding portion of the plow beam, and in which bail there are provided two corresponding adjustment members which are adapted to engage the forward upper and rear bottom edge portions of the plow beam, and upon the adjustment of which the plow body is adapted to be swung about journal means connected to the bottom forward end of the plow beam.

A suitable embodiment of the invention will be described hereinafter with reference to the appended drawings, in which FIG. 1 illustrates a plow body as seen from its landside, whereas FIG. 2 illustrates in a perspective view the same plow body as seen obliquely from above, from the rear and from the opposite side of the plow body, wherein i.e. the mould board of the plow body and the portion of the body member connected thereto have been cutaway.

As seen from the drawing the plow body, generally designated 1, is pivotally connected by means of a bolt 2 to a plow beam 3, of which only the portion connected to the plow body is shown. The plow body illustrated is of the kind comprising a cast body member 4 to which the different parts of the plow body are detachably connected in a nonillustrated known manner. Of these parts only the plow share 5, the landside 6 and the mould board 7 with its extension 8 and stay 9 are illustrated in the drawings. The plow beam 3 engages a surface at a vertical longitudinally disposed portion of the body member 4 facing away from the landside 6. At the upper rear part of this portion a U-shaped bail 10 is disposed, between which latter and the said portion the plow beam may be clamped by means of two bolts 11 by which the bail 10 may be clamped against the plow beam and the said portion of the body member 4. The space between the both shank portions of the bail denoted 10a is so dimensioned in relation to the plow beam 3, however, that the latter is accorded some pivotal motion relative to the plow body about the bolt 2, to permit an adjustment of the longitudinal inclination angle of the plow body. To effect this adjustment and to secure the plow body and the plow beam in their relative position of adjustment, so that they may be untightened yet are effectively held, an adjustment screw 12 is provided in a corresponding threaded bore in each of said shank portions. These screws 12 extend through the shank portions 10a substantially in a circumferential direction relative to the bolt 2 and are adapted to engage the forward upper and rear bottom edge surfaces, respectively, of the plow beam 3, whereby adjustment of these screws 12 will cause the plow body 1 to swing about the bolt 2 into the desired position of adjustment, whereafter the bolts 2 and 11 are tightened for additionally securing the plow body 1 in its position of adjustment relative to the plow beam 3.

The invention is, of course, not restricted to the embodiment described above and illustrated in the drawings, but may be varied as to its details within the scope of the inventive idea. Thus, it is feasible to let the bail 10 and bolt 2 exchange positions when the plow design allows of that in other respects.

We claim:
1. An adjustable plow arrangement comprising in combination:
   a plow beam;
   a plow body carried by a lower end portion of said plow beam;
   apparatus for rigidly securing said plow body to said plow beam comprising;
   a relatively lower pivot device providing adjustability between said plow beam and said plow body in a plane longitudinal to said plow;
   a U-shaped bail located relatively higher with respect to said lower pivot device, said U-shaped member straddling the plow beam and providing a clearance between the interior walls of said U-shaped bail and opposing surfaces of the plow beam;
   a bolt at each end of the U-shaped bail engaging the plow body for clamping said plow beam tightly against the plow body; and
   adjustable abutment means located on each arm of the U-shaped bail, said abutment means extending transversely of the plow beam for engagement with an opposed surface in any one relative angular position of said plow beam and said plow body allowed by said clearance.

2. A plow arrangement as recited in claim 1 wherein said plow body comprises a body member, said body member being carried by said plow beam, said body supporting a plow share, a mould board and a landside.

3. A plow arrangement as recited in claim 2 wherein the adjustable abutment means comprise screw members held in threaded bores through the U-shaped bail member.